US012560750B2

(12) United States Patent　　　　(10) Patent No.:　US 12,560,750 B2
　　　Miyake et al.　　　　　　　　　(45) Date of Patent:　　Feb. 24, 2026

(54) OPTICAL FILTER

(71) Applicants:AGC Inc., Tokyo (JP); Optical Coatings Japan, Tokyo (JP)

(72) Inventors: Masaaki Miyake, Tokyo (JP); Naoto Tatsuoka, Tokyo (JP)

(73) Assignees: AGC Inc., Tokyo (JP); Optical Coatings Japan, Tokyo (JP)

( * ) Notice: Subject to any disclaimer, the term of this patent is extended or adjusted under 35 U.S.C. 154(b) by 667 days.

(21) Appl. No.: 17/958,489

(22) Filed: Oct. 3, 2022

(65) Prior Publication Data

US 2023/0107099 A1　　Apr. 6, 2023

(30) Foreign Application Priority Data

Oct. 6, 2021　(JP) ................................. 2021-165073

(51) Int. Cl.
　　*G02B 5/20*　　　　(2006.01)
　　*G01S 7/481*　　　 (2006.01)
(52) U.S. Cl.
　　CPC .............. *G02B 5/208* (2013.01); *G01S 7/481* (2013.01)
(58) Field of Classification Search
　　CPC . G02B 5/208; G02B 5/20; G02B 5/28; G02B 5/281; G02B 5/285; G02B 5/286; G02B 5/287; G02B 5/26; G01S 7/481; G01S 7/4813
　　See application file for complete search history.

(56) References Cited

U.S. PATENT DOCUMENTS

| | | | |
|---|---|---|---|
| 2018/0095203 A1* | 4/2018 | Ooi ......................... | G02B 5/208 |
| 2019/0079339 A1 | 3/2019 | Fujii | |
| 2020/0209448 A1* | 7/2020 | Rowlands ............... | C23C 28/42 |
| 2021/0255377 A1* | 8/2021 | Liu ........................ | G02B 5/281 |

FOREIGN PATENT DOCUMENTS

JP　　　　　　6881172 B2　　6/2021

* cited by examiner

*Primary Examiner* — Stephone B Allen
*Assistant Examiner* — Adam W Booher
(74) *Attorney, Agent, or Firm* — Oblon, McClelland, Maier & Neustadt, L.L.P.

(57)　　　　　　　ABSTRACT

An optical filter including: a substrate having a first major surface and a second major surface; a first dielectric multilayer film laid on or above the first major surface; and a second dielectric multilayer film laid on or above the second major surface, in which: each of the first dielectric multilayer film and the second dielectric multilayer film is a laminate in which one or more low refractive index films, one or more medium refractive index films, and one or more high refractive index films are laid; each of the first dielectric multilayer film and the second dielectric multilayer film includes two or more medium refractive index films; each of the first dielectric multilayer film and the second dielectric multilayer film includes a structure that the low refractive index film, the medium refractive index film, and the high refractive index film are laid in order; and the optical filter satisfies both of the spectral characteristics (i-1) and (i-2).

11 Claims, 10 Drawing Sheets

OPTICAL FILTER REFLECTANCE
(MEASURED FROM THE SIDE OF MULTILAYER FILM S1 (5°))

OPTICAL FILTER REFLECTANCE
(MEASURED FROM THE SIDE OF MULTILAYER FILM S2 (50°))

- - - - - Example 1
———— Example 2
• • • • • Example 3
═══════ Example 4
— — Example 5
═ ═ Example 8

OPTICAL FILTER REFLECTANCE
(MEASURED FROM THE SIDE OF MULTILAYER FILM S2 (50°))

OPTICAL FILTER REFLECTANCE
(MEASURED FROM THE SIDE OF MULTILAYER FILM S2 (50°))

wavelength (nm)

OPTICAL FILTER REFLECTANCE
(MEASURED FROM THE SIDE OF MULTILAYER FILM S2 (50°))

wavelength (nm)

OPTICAL FILTER

CROSS-REFERENCE TO RELATED APPLICATIONS

This application claims priority from Japanese Patent Application No. 2021-165073 filed on Oct. 6, 2021, the entire subject matter of which is incorporated herein by reference.

TECHNICAL FIELD

The present disclosure relates to an optical filter that interrupts visible light and transmits infrared light.

BACKGROUND ART

To increase the sensitivity of the sensor such as a light detection and ranging (LiDAR) sensor, an optical filter that transmits near infrared light of 800 nm or longer and interrupts visible light causing external disturbance is used as a cover of a sensor module that irradiates a target object with near infrared laser light and detects return reflection light. In particular, a cover of a vehicular sensor module is required to be high in the transmissivity for near infrared light so that near infrared laser light for measurement reaches a distant place.

Patent document 1 discloses a transparent substrate with an antireflection film that has a transparent substrate and an antireflection film formed by stacking high refractive index films and low refractive index films and that is suitable for use as a cover of a vehicular display device having a near infrared sensor.

CITATION LIST

Patent Literature

Patent document 1: Japanese Patent No. 6,881,172

In vehicular sensor modules, a near infrared laser light source and a sensor are disposed on the same side of a cover. In these vehicular sensor modules, if the near infrared light reflectance of the cover is high, near infrared light reflected by the cover surfaces enters the sensor to possibly produce noise. Furthermore, near infrared light that returns from a target object is reflected by the cover surfaces to possibly lower the sensor sensitivity. In general, there is a tendency that the reflectance increases as the incident angle of light becomes larger.

SUMMARY OF INVENTION

An object of the present invention is to provide an optical filter capable of suppressing increase of the near infrared light reflectance while keeping the near infrared light transmittance high, even for light that enters the optical filter at a large incident angle.

The invention provides an optical filter having the following configuration:

(1) An optical filter including:

a substrate having a first major surface and a second major surface;

a first dielectric multilayer film laid on or above the first major surface; and a second dielectric multilayer film laid on or above the second major surface, in which:

each of the first dielectric multilayer film and the second dielectric multilayer film is a laminate in which one or more low refractive index films, one or more medium refractive index films, and one or more high refractive index films are laid;

each of the first dielectric multilayer film and the second dielectric multilayer film includes two or more medium refractive index films;

each of the first dielectric multilayer film and the second dielectric multilayer film includes a structure that the low refractive index film, the medium refractive index film, and the high refractive index film are laid in order; and the optical filter satisfies both of the following spectral characteristics (i-1) and (i-2):

(i-1) a maximum transmittance $T_{800-1600(0)MAX}$ at an incident angle 0° in a wavelength range of 800 nm to 1,600 nm is 90% or higher; and (i-2) a minimum reflectance $R_{800-1600(50)MIN}$ at an incident angle 50° in the wavelength range of 800 nm to 1,600 nm is 1% or lower.

The invention can provide an optical filter capable of suppressing increase of the near infrared light reflectance while keeping the near infrared light transmittance high, even for light that enters the optical filter at a large incident angle.

DETAILED DESCRIPTION OF EMBODIMENT

In this specification, for example, the expression "the transmittance is 90% or higher in a particular wavelength range" means that the transmittance is not lower than 90% in all of that wavelength range, that is, the lowest transmittance in that wavelength range is 90% or higher. Likewise, for example, the expression "the transmittance is 1% or lower in a particular wavelength range" means that the transmittance is not higher than 1% in all of that wavelength range, that is, the highest transmittance in that wavelength range is 1% or lower. An average transmittance in a particular wavelength range is an arithmetic average of transmittance values every 1 nm in wavelength in that wavelength range.

The term "refractive index" means a refractive index for light having a wavelength 589 nm at 20° C. unless otherwise specified.

Spectral characteristics can be measured using a spectrophotometer or calculated by a simulation using optical thin film calculation software.

If no particular incident angle is specified for a spectral characteristic, the incident angle is 0° (i.e., the incident direction is perpendicular to the major surface of the optical filter).

In this specification, the symbol "-" or the word "to" that is used to express a numerical range includes the numerical values before and after the symbol or the word as the upper limit and the lower limit of the range, respectively.

<Optical Filter>

An optical filter according to an embodiment of the invention (hereinafter may also be referred to as "present filter") is equipped with a substrate, a first dielectric multilayer film and a second dielectric multilayer film that are laid on or above the two respective major surfaces of the substrate.

Figure 1:
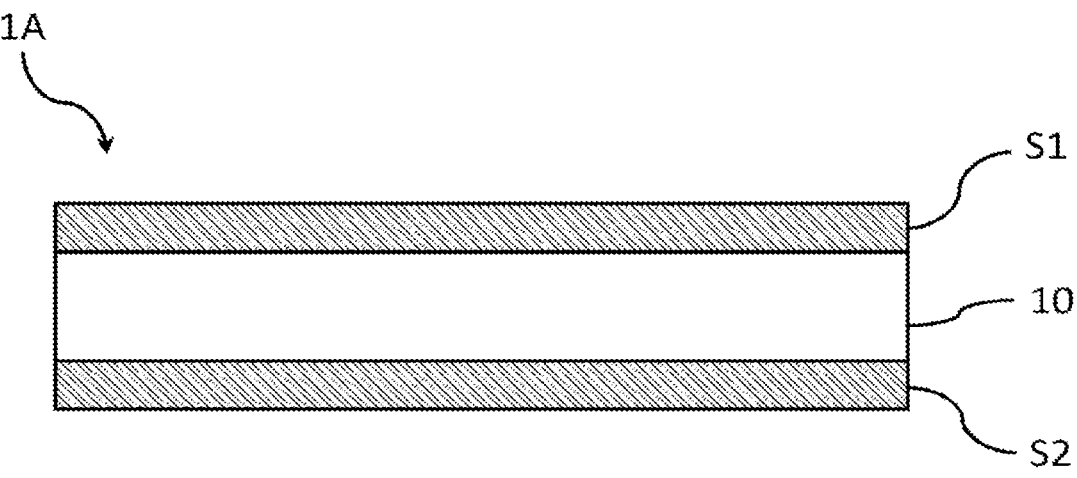
FIG. 1 is a schematic sectional view illustrating one example of an optical filter according to an embodiment.
Figure 2:
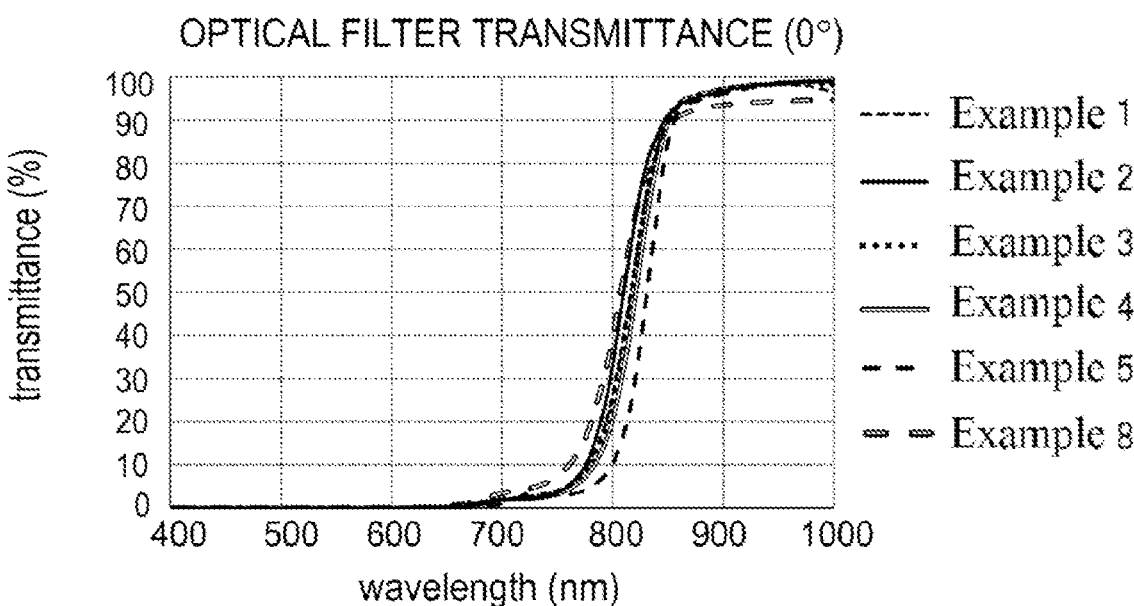
FIG. 2 is a graph showing spectral transmittance curves of optical filters of Examples 1-5, and 8 in a case that the incident angle was 0°.
Figure 3:
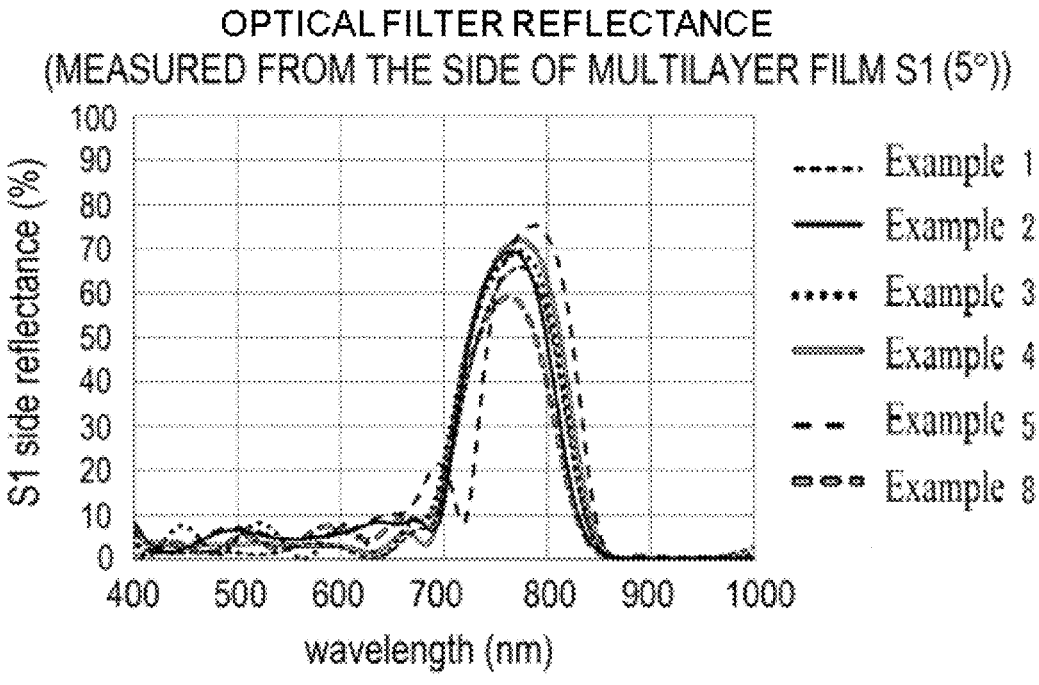
FIG. 3 is a graph showing spectral reflectance curves of the optical filters of Examples 1-5, and 8 in a case that the incident angle was 5° and measurements were made from the side of a multilayer film S1.
Figure 4:
FIG. 4 is a graph showing spectral reflectance curves of the optical filters of Examples 1-5, and 8 in a case that the incident angle was 5° and measurements were made from the side of a multilayer film S2.
Figure 4:
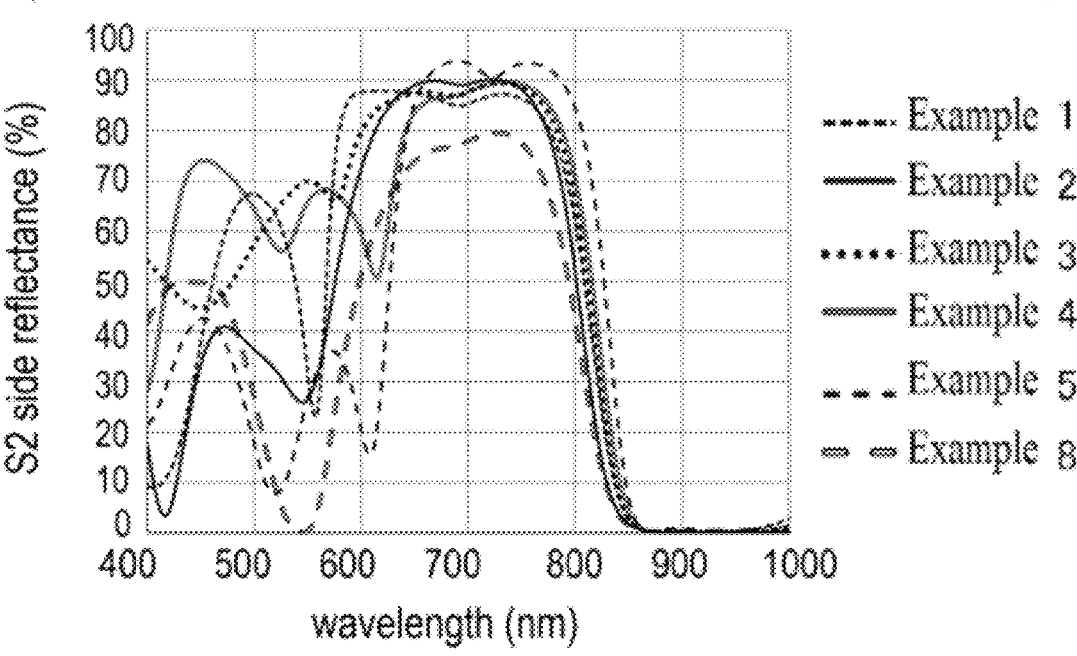
Figure 5:
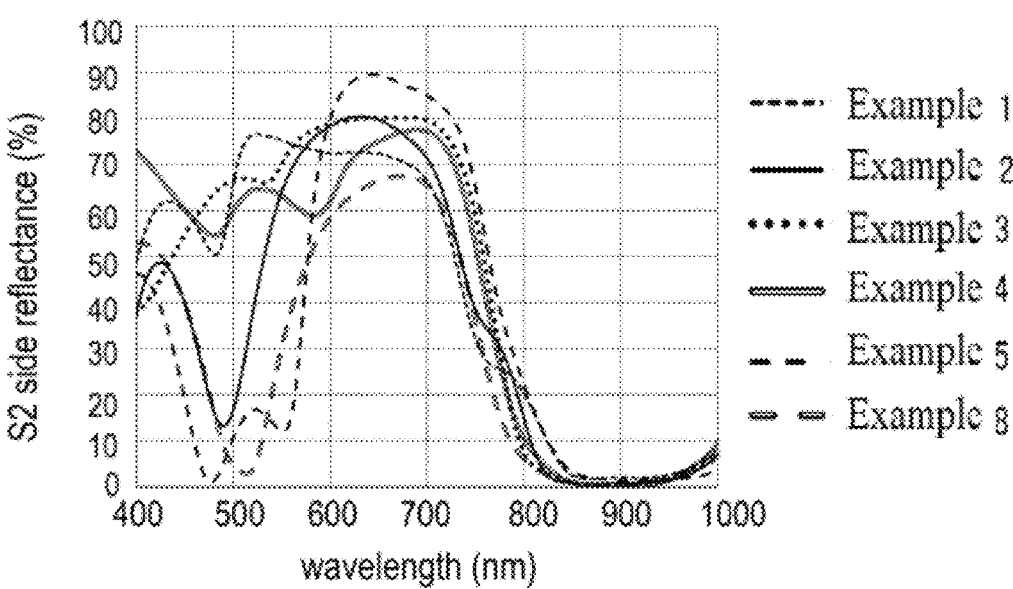
FIG. 5 is a graph showing spectral reflectance curves of the optical filters of Examples 1-5, and 8 in a case that the incident angle was 50° and measurements were made from the side of the multilayer film S2.
Figure 6:
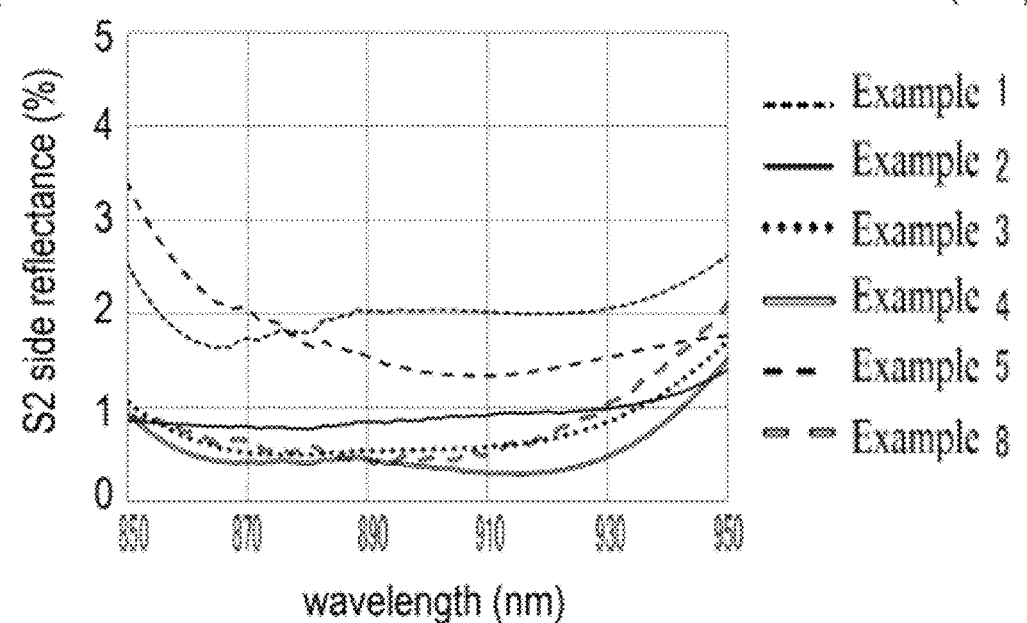
FIG. 6 is a graph showing spectral reflectance curves in a near infrared range of the optical filters of Examples 1-5, and 8 in a case that the incident angle was 50° and measurements were made from the side of the multilayer film S2.
Figure 7:
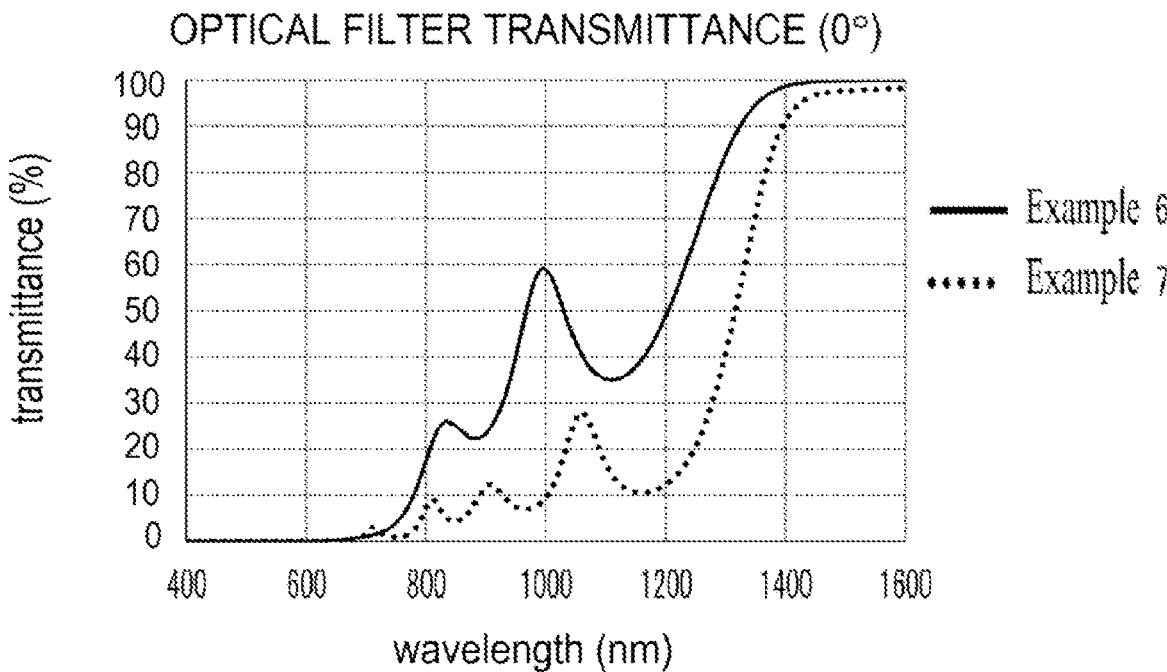
FIG. 7 is a graph showing spectral transmittance curves of the optical filters of Examples 6 and 7 in a case that the incident angle was 0°.
Figure 8:
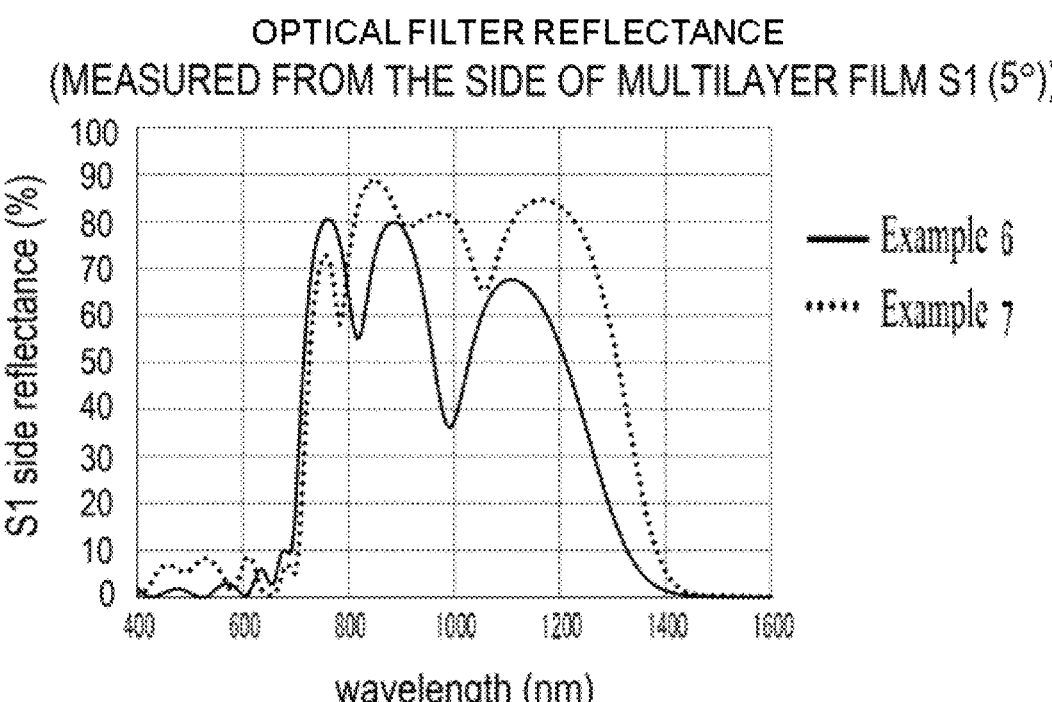
FIG. 8 is a graph showing spectral reflectance curves of the optical filters of Examples 6 and 7 in a case that the incident angle was 5° and measurements were made from the side of the multilayer film S1.
Figure 9:
FIG. 9 is a graph showing spectral reflectance curves of the optical filters of Examples 6 and 7 in a case that the incident angle was 5° and measurements were made from the side of the multilayer film S2.
Figure 9:
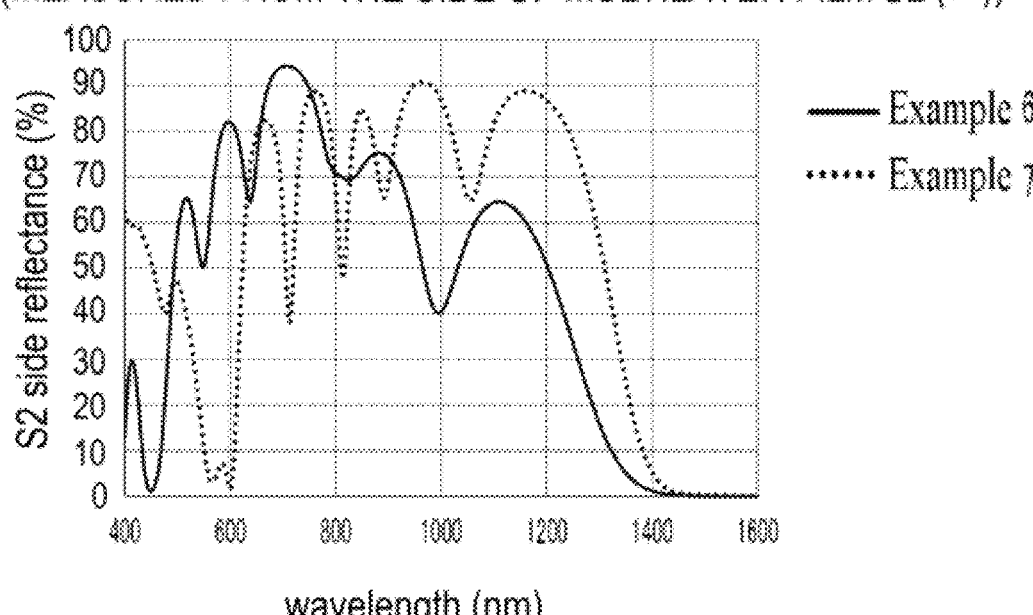
Figure 10:
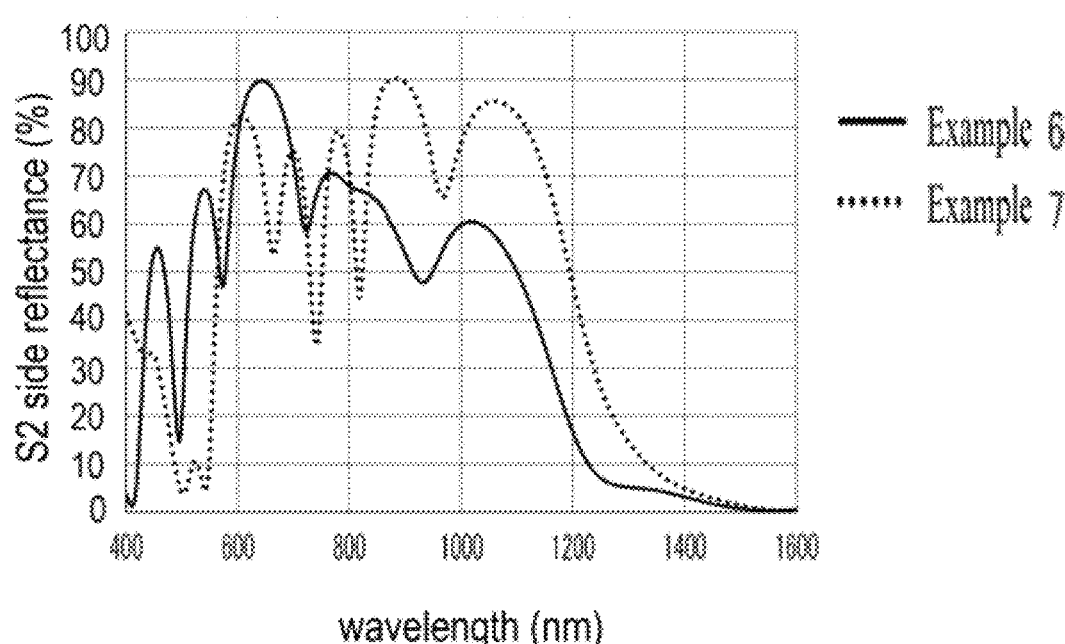
FIG. 10 is a graph showing spectral reflectance curves of the optical filters of Examples 6 and 7 in a case that the incident angle was 500 and measurements were made from the side of the multilayer film S2.
Figure 11:
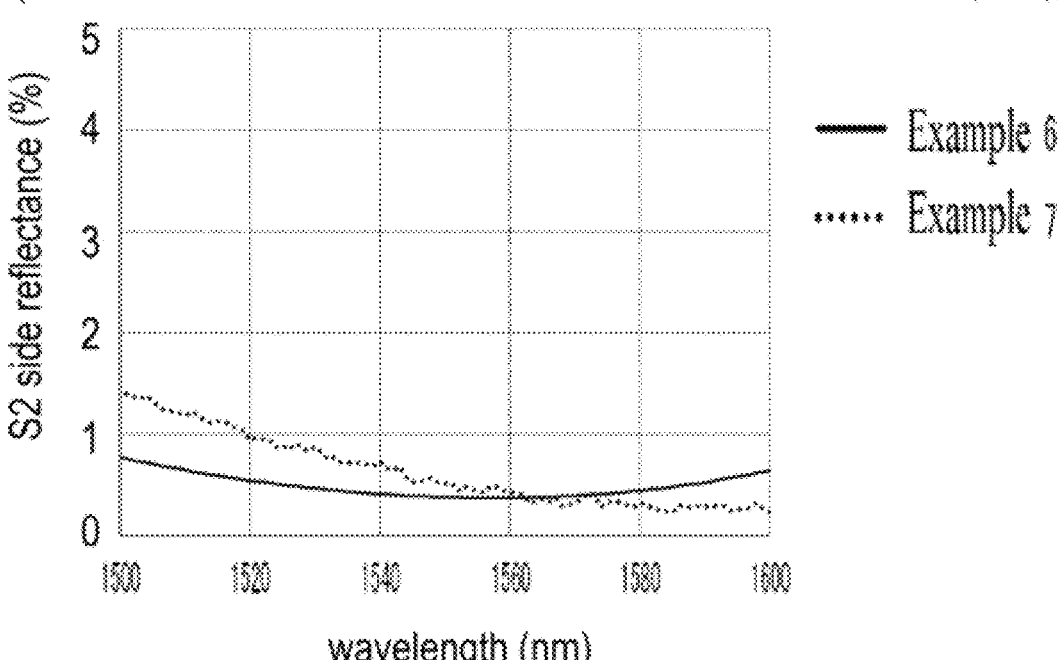
FIG. 11 is a graph showing spectral reflectance curves in a near infrared range of the optical filters of Examples 6 and 7 in a case that the incident angle was 50° and measurements were made from the side of the multilayer film S2.

An example configuration of the present filter will be described with reference to a drawing. FIG. 1 is a schematic sectional view illustrating one example of an optical filter according to the embodiment.

The optical filter 1A illustrated in FIG. 1 is an example in which a dielectric multilayer film S1 is formed on or above one major surface of a substrate 10 and a dielectric multilayer film S2 is formed on or above the other major surface. The expression to have a particular layer "on or above a major surface of a substrate" is not limited to a case that the particular layer is in contact with the major surface of the substrate but includes a case that another function layer is provided between the substrate and the particular layer. It is preferable that the dielectric multilayer films S1 and S2 be laid as outermost layers.

<Dielectric Multilayer Films>

Dielectric multilayer films are designed so as to have wavelength selectivity. In the invention, the dielectric multilayer films are layers that interrupt visible light, transmit near infrared light, and are low in near infrared reflectivity.

Each of the first dielectric multilayer film and the second dielectric multilayer film (hereinafter also referred to as "dielectric multilayer films of the invention") is a laminate in which at least one low refractive index film, at least one medium refractive index film, and at least one high refractive index film are laid. The medium refractive index film(s) are lower in refractive index than the high refractive index film(s) and higher in refractive index than the low refractive index film(s). Laying thin films having different refractive indices makes it possible to increase or decrease the reflectance utilizing the interference action of light.

Each of the dielectric multilayer films employed in the invention has at least two medium refractive index films and has at least one structure in which a low refractive index film, a medium refractive index film, and a high refractive index film are laid in this order. Although a partial structure A in which a high refractive index film, a medium refractive index film, and a high refractive index film are laid in this order, a partial structure B in which a low refractive index film, a medium refractive index film, and a high refractive index film are laid in this order, and a partial structure C in which a low refractive index film, a medium refractive index film, and a low refractive index film are laid in this order are conceivable as lamination patterns involving a medium refractive index film, in each of the dielectric multilayer films of the invention the partial structure B in which the refractive index varies stepwise is indispensable.

In the case where at least two medium refractive index films and at least one partial structure B are provided, increase of the near infrared light reflectance can be suppressed while keeping the near infrared light transmittance high, even for light that enters the optical filter at a large incident angle. That is, each of the dielectric multilayer films of the invention functions as an antireflection film in a near infrared range.

The order of each of the dielectric films in the partial structure B is not limited. The partial structure B may have either a lamination pattern that a low refractive index film, a medium refractive index film, and a high refractive index film are laid in this order or a lamination pattern that a high refractive index film, a medium refractive index film, and a low refractive index film are laid in this order.

From the viewpoint of preventing productivity reduction due to layer switching and preventing reduction of the film thickness controllability due to formation of a number of layers, it is preferable that the number of medium refractive index films in each dielectric multilayer film be four or smaller.

Each dielectric multilayer film may have not only the partial pattern B but also the partial pattern A and the partial pattern C as a lamination pattern(s) involving a medium refractive index film. From the viewpoint of increasing the effect of suppressing increase of the reflectance for light that enters the optical filter at a large incident angle, it is preferable that each dielectric multilayer film has only the partial pattern B or has a combination of the partial pattern B and the partial structure A as a lamination pattern(s) involving a medium refractive index film.

Examples of a material of each high refractive index film include silicon (Si). Among various kinds of silicon, from the viewpoint of obtaining visible light absorbability, amorphous silicon is preferable and (amorphous) silicon that is not doped with hydrogen is particularly preferable.

It is preferable that the refractive index of each high refractive index film be 3.0 or higher, even preferably 4.0 or higher.

Materials that are lower in refractive index than materials of each high refractive index film and higher than materials (described later) of each low refractive index film can be used for each medium refractive index film. Examples of such materials include $Ta_2O_5$, $Nb_2O_5$, $TiO_2$, $ZrO_2$, $HfO_2$, SiO, and $Al_2O_3$. Among these examples, $Nb_2O_5$ and $Ta_2O_5$ are preferable from the viewpoints of the ease of attaining a good film design that is high in the effect of suppressing increase of the reflectance for light that enters the optical filter at a large incident angle and high reproducibility of optical constants.

It is preferable that the refractive index of each medium refractive index film be in a range of 1.6 to 3.0, even preferably 1.8 to 2.5.

Materials of each low refractive index film can be such as to be lower in refractive index than materials of each medium refractive index film. Examples of such materials include $SiO_2$, $SiO_xN_y$, SiO, SiN, and $Al_2O_3$. Among these examples, $SiO_2$ is preferable from the viewpoint of productivity.

It is preferable that the refractive index of each low refractive index film be 2.0 or lower, even preferably 1.5 or lower.

From the viewpoints of decreasing the reflectance in a visible range, preventing productivity reduction due to layer switching, and preventing reduction of the film thickness controllability due to formation of a number of layers, it is preferable that the number of lamination layers of the first dielectric multilayer film be 10 to 22, even preferably 12 to 20.

From the viewpoints of decreasing the transmittance in a visible range, preventing productivity reduction due to layer switching, and preventing reduction of the film thickness controllability due to formation of a number of layers, it is preferable that the number of lamination layers of the second dielectric multilayer film be 8 to 26, even preferably 10 to 24.

In the first dielectric multilayer film, from the viewpoints of decreasing the reflectance in a visible range, the effect of suppressing increase of the reflectance for near infrared light that enters the optical filter at a large incident angle, preventing productivity reduction due to layer switching, and preventing reduction of the film thickness controllability due to formation of a number of layers, it is preferable that the number of the high refractive index films be 5 to 9, the number of the medium refractive index films be 2 to 3, and the number of the low refractive index films be 5 to 8.

In the second dielectric multilayer film, from the viewpoints of the effect of suppressing increase of the reflectance for near infrared light that enters the optical filter at a large incident angle, preventing productivity reduction due to layer switching, and preventing reduction of the film thickness controllability due to formation of a number of layers, it is preferable that the number of the high refractive index films be 2 to 10, the number of the medium refractive index films be 2 to 3, and the number of the low refractive index films be 5 to 12.

From the viewpoints of decreasing the reflectance in a visible range and the effect of suppressing increase of the reflectance for near infrared light that enters the optical filter at a large incident angle, it is preferable that the total number of lamination layers of the first dielectric multilayer film and the second dielectric multilayer film be 25 or larger, even preferably 28 or larger. Furthermore, from the viewpoints of preventing productivity reduction due to layer switching and preventing reduction of the film thickness controllability due to formation of a number of layers, it is preferable that the total number of lamination layers of the first dielectric multilayer film and the second dielectric multilayer film be 50 or smaller, even preferably 40 or lower.

From the viewpoints of decreasing the reflectance in a visible range, preventing productivity reduction due to layer switching, and preventing reduction of the film thickness controllability due to formation of a number of layers, it is preferable that the thickness of the first dielectric multilayer film be 0.3 μm to 1.3 μm, even preferably 0.4 μm to 1.2 μm.

From the viewpoints of decreasing the transmittance in a visible range, preventing productivity reduction due to layer switching, and preventing reduction of the film thickness controllability due to formation of a number of layers, it is preferable that the thickness of the second dielectric multilayer film be 0.8 μm to 1.6 μm, even preferably 0.9 μm to 1.5 μm.

From the viewpoints of decreasing the reflectance in a visible range, decreasing the transmittance in a visible range, preventing productivity reduction due to layer switching, and preventing reduction of the film thickness controllability due to formation of a number of layers, it is preferable that the total thickness of the first dielectric multilayer film and the second dielectric multilayer film be 1.2 μm to 2.9 μm, even preferably 1.3 μm to 2.7 μm.

From the viewpoints of decreasing the transmittance in a visible range, preventing productivity reduction due to layer switching, and preventing reduction of the film thickness controllability due to formation of a number of layers, it is preferable that the total thickness of high refractive index films in each of the first dielectric multilayer film and the second dielectric multilayer film be 0.1 μm to 0.6 μm, even preferably 0.2 μm to 0.5 μm.

From the viewpoints of the effect of suppressing increase of the reflectance for near infrared light that enters the optical filter at a large incident angle, preventing productivity reduction due to layer switching, and preventing reduction of the film thickness controllability due to formation of a number of layers, it is preferable that the total thickness of medium refractive index films in each of the first dielectric multilayer film and the second dielectric multilayer film be 0.1 μm to 0.9 μm, even preferably 0.2 μm to 0.8 μm.

From the viewpoints of the effect of suppressing increase of the reflectance for near infrared light that enters the optical filter at a large incident angle, preventing productivity reduction due to layer switching, and preventing reduction of the film thickness controllability due to formation of a number of layers, it is preferable that the total thickness of low refractive index films in each of the first dielectric multilayer film and the second dielectric multilayer film be 0.8 μm to 1.8 μm, even preferably 1.0 μm to 1.6 μm.

To form each dielectric multilayer film, for example, dry film forming processes such as CVD, sputtering, and vacuum vapor deposition and wet film forming processes such as a spray method and a dip method can be used.

The optical filter according to the invention is equipped with two dielectric multilayer films (i.e., two sets of dielectric multilayer films), and it is preferable that the above-mentioned requirements be satisfied by at least one dielectric multilayer film.

In the case where a silicon (Si) film is used as a high refractive index film and a medium refractive index film is formed immediately after the formation of the silicon (Si) film, a surface layer of the silicon film may be oxidized. Thus, in this specification, in the case where there exists a structure that a silicon film, a silicon oxide film, and a medium refractive index film are formed from the substrate side, the total thickness of the silicon film and the silicon oxide film may be regarded as the thickness of the high refractive index film.

<Substrate>

The substrate of the present filter may have either a single-layer structure or a plural-layer structure. The material of the substrate is not particularly limited and may be either an organic material or an inorganic material as long as it is a transparent material that transmits near infrared light. Furthermore, plural materials may be used in combination.

Preferable transparent inorganic materials include glass and a crystal material.

Examples of glass materials include soda-lime glass, borosilicate glass, alkali-free glass, quarts glass, and aluminosilicate glass.

Another example of the glass material includes chemically strengthened glass obtained by replacing alkali metal ions existing adjacent to a major surface of a glass plate and having a small ion diameter (e.g., Li ions or Na ions) with alkali ions having a larger ion diameter (e.g., Na ions or K ions for Li ions or K ions for Na ions) by ion exchange at a glass transition temperature or lower.

Examples of crystal materials include birefringent crystals such as quarts, lithium niobate, and sapphire.

There are no particular limitations on the shape of the substrate; it may have a block shape, a plate shape, or a film shape.

From the viewpoints of reduction in the degree of warp when the dielectric multilayer film is formed, height reduction of the optical filter, and suppression of braking, it is preferable that the thickness of the substrate be 0.1 mm to 5 mm, even preferably 2 mm to 4 mm.

<Optical Filter>

The optical filter according to the invention which is equipped with the substrate and the dielectric multilayer films functions as an IR bandpass filter that interrupts visible light and transmits near infrared light.

The optical filter satisfies both of the following spectral characteristics (i-1) and (i-2):

(i-1) a maximum transmittance $T_{800-1600(0)MAX}$ at an incident angle 0° in a wavelength range of 800 nm to 1,600 nm is 90% or higher; and (i-2) a minimum reflectance $R_{800-1600(50)MIN}$ at an incident angle 50° in the wavelength range of 800 nm to 1,600 nm is 1% or lower.

The spectral characteristic (i-1) means that the transmittance in the near infrared range of 800 nm to 1,600 nm is high and the spectral characteristic (i-2) means that the reflectance at the incident angle 50° in the same wavelength range is low. In the case where the spectral characteristics (i-1) and (i-2) are satisfied, an optical filter can be obtained in which increase of the reflectance for near infrared light is suppressed while the transmittance for near infrared light is kept high, even for light whose incident angle is large.

For example, the spectral characteristic (i-1) can be realized by using a material that is low in the near infrared light absorbability as a material of a high refractive index film; in particular, it is preferable to use a silicon film as a high refractive index film. The spectral characteristic (i-2) can be realized by forming, on or above the two respective major surfaces, the first dielectric multilayer film and the second dielectric multilayer film having the above-described particular structure, that is, dielectric multilayer films each having a medium refractive index film that satisfies the particular conditions.

It is preferable that $T_{800-1600(0)MAX}$ in the spectral characteristic (i-1) be 92% or higher, even preferably 94% or higher.

It is preferable that $R_{800-1600(50)MIN}$ in the spectral characteristic (i-2) be 0.8% or lower, even preferably 0.6% or lower.

A reflectance value of the spectral characteristic (i-2) is measured from the side of the second dielectric multilayer film.

It is preferable that the wavelength range in which the spectral characteristics (i-1) and (i-2) are satisfied be the same range in the near infrared range of 800 nm to 1,600 nm, and it is even preferable that the optical filter satisfy both of the following spectral characteristics (i-11) and (i-21):

(i-11) a maximum transmittance $T_{X-Y\_(0)MAX}$ at an incident angle 0° in a wavelength range of X nm to Y nm is 90% or higher; and (i-21) a minimum reflectance $R_{X-Y(50)MIN}$ at an incident angle 50° in the wavelength range of X nm to Y nm is 1% or lower, where X is in a range of 800 nm to 1,560 nm, Y is in a range of 840 nm to 1,600 nm, and Y−X=40 nm.

It is preferable that the optical filter satisfy the high transmissivity and the low reflectivity stated in the spectral characteristics (i-1) and (i-2) in a particular, narrower infrared wavelength range. In this case, the sensor sensitivity is enhanced according to the wavelength range. Specifically, it is preferable that the following spectral characteristics (i-1A) and (i-2A), spectral characteristics (i-1B) and (i-2B), or spectral characteristics (i-1C) and (i-2C) be satisfied further:

(i-1A) a minimum transmittance $T_{880-920(0)MIN}$ at an incident angle 0° in a wavelength range of 880 nm to 920 nm is 90% or higher; and (i-2A) an average reflectance $R_{880-920(50)AVE}$ at an incident angle 50° in the wavelength range of 880 nm to 920 nm is 1% or lower, (i-1B) a minimum transmittance $T_{1310-1350(0)MIN}$ at an incident angle 0° in a wavelength range of 1,310 nm to 1,350 nm is 90% or higher; and (i-2B) an average reflectance $R_{1310-1350(50)AVE}$ at an incident angle 50° in the wavelength range of 1,310 nm to 1,350 nm is 1% or lower, or (i-1C) a minimum transmittance $T_{1530-1570(0)MIN}$ at an incident angle 0° in a wavelength range of 1,530 nm to 1,570 nm is 90% or higher; and (i-2C) an average reflectance $R_{1530-1570(50)AVE}$ at an incident angle 50° in the wavelength range of 1,530 nm to 1,570 nm is 1% or lower.

For example, the spectral characteristic (i-1A), (i-1B), or (i-1C) can be realized by using a material that is low in the near infrared light absorbability as a material of a high refractive index film; in particular, it is preferable to use a silicon film as a high refractive index film.

The spectral characteristic (i-2A), (i-2B), or (i-2C) can be realized by forming, on or above the two respective major surfaces, the first dielectric multilayer film and the second dielectric multilayer film having the above-described particular structures, that is, dielectric multilayer films each involving a medium refractive index film that satisfies the particular conditions, and designing the optical filter so that the reflectance in the near infrared wavelength range prescribed in each spectral characteristic becomes low.

It is preferable that the optical filter satisfies, in addition to the above-described spectral characteristics (i-1) and (i-2) in the near infrared range, the following spectral characteristics (i-3) and (i-4) in a visible range:

(i-3) an average transmittance $T_{400-680(0)AVE}$ at an incident angle 0° in a wavelength range of 400 nm to 680 nm is 2% or lower; and (i-4) an average reflectance $R_{400-680(5)AVE}$ at an incident angle 5° in the wavelength range of 400 nm to 680 nm is 10% or lower.

The spectral characteristic (i-3) means that the transmittance in the visible range of 400 nm to 680 nm is low and the spectral characteristic (i-4) means that the reflectance at an incident angle 5° in the same wavelength range is low. In the case where the spectral characteristics (i-3) and (i-4) are satisfied, both of the transmission color and the reflection color become black, whereby an optical filter can be obtained that is high in design performance. Furthermore, since the optical filter appears black, an advantage is obtained that the inside of a sensor is made less viewable from the outside: the optical filter is thus suitable for use as a cover of a vehicular.

For example, the spectral characteristics (i-3) can be realized by using a material that is high in the visible light absorbability as a material of a high refractive index film; in particular, it is preferable to use a silicon film as a high refractive index film. For example, the spectral characteristic (i-4) can be realized by using dielectric multilayer films that are designed so as to provide a desired visible light reflectance.

It is preferable that $T_{400-680(0)AVE}$ in the spectral characteristic (i-3) be 1% or lower, even preferably 0.5% or lower.

It is preferable that $R_{400-680(5)AVE}$ in the spectral characteristic (i-4) be 8% or lower, even preferably 6% or lower.

A reflectance value of the spectral characteristic (i-4) is measured from the side of the first dielectric multilayer film.

The above-described embodiment can provide an optical filter capable of suppressing increase of the near infrared light reflectance while keeping the near infrared light transmittance high, even for light that enters the optical filter at a large incident angle.

If necessary, the optical filter according to the invention may have a structure other than the above-described substrate and dielectric multilayer films. For example, the optical filter may further have an antifouling film on or above a dielectric multilayer film to make it easier to remove a stain from each major surface of the optical filter. Furthermore, an antiglare layer may further be formed on or above a dielectric multilayer film to increase the visibility by scattering external light. Still further, a water-repellent film may further be formed on or above a dielectric multilayer film to make it easier to remove water from each major surface of the optical filter. Moreover, a conductive film may be formed on or above or beneath a dielectric multilayer film to give the optical filter a heater function or an anti-EMI (electromagnetic interference) function.

In installing the optical filter according to the invention as a cover of a sensor module, it is preferable to set the second dielectric multilayer film on the sensor side (i.e., inside) so that the spectral characteristic (i-2) is satisfied, that is, low reflectivity is obtained at a large incident angle in a near infrared region. Furthermore, it is preferable to set the first dielectric multilayer film outside so that the spectral characteristic (i-4) is satisfied, that is, low reflectivity is obtained in a visible range.

A LiDAR sensor according to the invention includes the above optical filter according to the invention and thus the LiDAR sensor has excellent sensitivity and appearance. In the LiDAR sensor according to the invention, the optical filter according to the invention is used as a cover of a sensor module.

As described above, this specification discloses the following optical filters and LiDAR sensor.

(1) An optical filter including:

a substrate having a first major surface and a second major surface;

a first dielectric multilayer film laid on or above the first major surface; and a second dielectric multilayer film laid on or above the second major surface, in which:

each of the first dielectric multilayer film and the second dielectric multilayer film is a laminate in which one or more low refractive index films, one or more medium refractive index films, and one or more high refractive index films are laid;

each of the first dielectric multilayer film and the second dielectric multilayer film includes two or more medium refractive index films;

each of the first dielectric multilayer film and the second dielectric multilayer film includes a structure that the low refractive index film, the medium refractive index film, and the high refractive index film are laid in order; and the optical filter satisfies both of the following spectral characteristics (i-1) and (i-2):

(i-1) a maximum transmittance $T_{800-1600(0)MAX}$ at an incident angle 0° in a wavelength range of 800 nm to 1,600 nm is 90% or higher; and (i-2) a minimum reflectance $R_{800-1600(50)MIN}$ at an incident angle 50° in the wavelength range of 800 nm to 1,600 nm is 1% or lower.

(2) The optical filter according to item (1), in which the optical filter further satisfies both of the following spectral characteristics (i-3) and (i-4):

(i-3) an average transmittance $T_{400-680(0)AVE}$ at an incident angle 0° in a wavelength range of 400 nm to 680 nm is 2% or lower; and (i-4) an average reflectance $R_{400-680(5)AVE}$ at an incident angle 5° in the wavelength range of 400 nm to 680 nm is 10% or lower.

(3) The optical filter according to items (1) or (2), in which the first dielectric multilayer film and the second dielectric multilayer film have a total thickness of 1.2 μm to 2.9 μm.

(4) The optical filter according to any one of items (1) to (3), in which the first dielectric multilayer film has a number of lamination layers of 10 to 22.

(5) The optical filter according to any one of items (1) to (4), in which the second dielectric multilayer film has a number of lamination layers of 8 to 26.

(6) The optical filter according to any one of items (1) to (5), in which the first dielectric multilayer film has a thickness of 0.3 μm to 1.3 μm.

(7) The optical filter according to any one of items (1) to (6), in which the second dielectric multilayer film has a thickness of 0.8 μm to 1.6 μm.

(8) The optical filter according to any one of items (1) to (7), in which the high refractive index films have a total thickness of 0.1 μm to 0.6 μm in each of the first dielectric multilayer film and the second dielectric multilayer film.

(9) The optical filter according to any one of items (1) to (8), in which the medium refractive index films have a total thickness of 0.1 μm to 0.9 μm in each of the first dielectric multilayer film and the second dielectric multilayer film.

(10) The optical filter according to any one of items (1) to (9), in which the low refractive index films have a total thickness of 0.8 μm to 1.8 μm in each of the first dielectric multilayer film and the second dielectric multilayer film.

(11) A LiDAR sensor including the optical filter according to any one of items (1) to (10) as a cover of a sensor module.

EXAMPLES

Next, the invention will be described in more detail using Examples.

Spectral characteristics were calculated by a simulation using optical thin-film calculation software.

As for the spectral characteristics, when no particular incident angle is shown, measurement values are ones that were obtained at an incident angle of 0° (i.e., in the direction perpendicular to a major surface of an optical filter).

A 2 mm-thick aluminosilicate glass plate was used as a transparent glass plate.

Si (amorphous silicon that is not doped with hydrogen, refractive index: 4.5), $Ta_2O_5$ (refractive index: 2.1), and $SiO_2$ (refractive index: 1.5) or Si (amorphous silicon that is not doped with hydrogen, refractive index: 4.5), $Nb_2O_5$ (refractive index: 2.3), and $SiO_2$ (refractive index: 1.5) were used as materials of dielectric multilayer films.

Example 1

Si films and $SiO_2$ films were laid in no particular order on one major surface of a transparent glass substrate by sputtering, whereby a dielectric multilayer film S1-1 was formed. And Si films and $SiO_2$ films were laid in no particular order on the other major surface of the transparent glass substrate by sputtering, whereby a dielectric multilayer film S1-2 was formed.

The total number of layers of each multilayer film, the total thickness of each multilayer film, the number of the laid Si films, the number of the laid $SiO_2$ films, the total thickness of the laid Si films, and the total thickness of the laid $SiO_2$ films are shown in Table 1 below.

An optical filter of Example 1 was thus obtained.

Examples 2-7

Si films, $Ta_2O_5$ films, and $SiO_2$ films were laid in no particular order on one major surface of a transparent glass substrate by sputtering, whereby each of dielectric multilayer films S1-2 to S1-7 were formed. And Si films, $Ta_2O_5$ films, and $SiO_2$ films were laid in no particular order on the other major surface of the transparent glass substrate by sputtering, whereby each of dielectric multilayer films S2-2 to S2-7 were formed.

The total number of layers of each multilayer film, the total thickness of each multilayer film, the number of laid Si films, the number of the laid $Ta_2O_5$ films, the number of the laid $SiO_2$ films, the total thickness of the laid Si films, the total thickness of the laid $Ta_2O_5$ films, and the total thickness of the laid $SiO_2$ films are shown in Table 1. Furthermore, the film thickness of a partial structure A ($Si/Ta_2O_5/Si$), the film thickness of a partial structure B ($SiO_2/Ta_2O_5/Si$), and the film thickness of a partial structure C ($SiO_2/Ta_2O_5/SiO_2$) are shown in Table 2.

An optical filter of each of Examples 2-7 was thus obtained.

Example 8

Si films, $Nb_2O_5$ films, and $SiO_2$ films were laid in no particular order on one major surface of a transparent glass substrate by sputtering, whereby a dielectric multilayer film S1-8 was formed. And Si films, $Nb_2O_5$ films, and $SiO_2$ films were laid in no particular order on the other major surface of the transparent glass substrate by sputtering, whereby a dielectric multilayer film S2-8 was formed.

The total number of layers of each multilayer film, the total thickness of each multilayer film, the number of the laid Si films, the number of the laid $Nb_2O_5$ films, the number of the laid $SiO_2$ films, the total thickness of the laid Si films, the total thickness of the laid $Nb_2O_5$ films, and the total thickness of the laid $SiO_2$ films are shown in Table 1. Furthermore, the film thickness of a partial structure B ($SiO_2/Nb_2O_5/Si$), and the film thickness of a partial structure C ($SiO_2/Nb_2O_5/SiO_2$) are shown in Table 2.

An optical filter of Example 8 was thus obtained.

It is noted that spectral characteristics of Example 8 were measured using a spectral photometer (Agilent Cary 7000).

Spectral characteristics of each optical filter are shown in Table 3 below and FIGS. 2-11. In Table 3, reflectance values in a near infrared range are values that were measured on the side of the dielectric multilayer film S2 and reflectance values in a visible range are values that were measured on the side of the dielectric multilayer film S1.

Examples 2-4 and 6-8 are Inventive Examples and Examples 1 and 5 are Comparative Examples.

TABLE 1

| Optical filter | Dielectric multilayer film | Total number of layers | Number of layers | | | Total thickness (nm) | Thickness (nm) | | |
|---|---|---|---|---|---|---|---|---|---|
| | | | Si | $Ta_2O_5$ | $SiO_2$ | | Si | $Ta_2O_5$ | $SiO_2$ |
| Ex. 1 | S1-1 | 11 | 5 | 0 | 6 | 314 | 107 | 0 | 207 |
| | S2-1 | 23 | 11 | 0 | 12 | 1,364 | 309 | 0 | 1,056 |
| | Total | 34 | 16 | 0 | 18 | 1,678 | 415 | 0 | 1,263 |
| Ex. 2 | S1-2 | 12 | 5 | 2 | 5 | 444 | 19 | 114 | 312 |
| | S2-2 | 24 | 10 | 2 | 12 | 1,377 | 361 | 147 | 869 |
| | Total | 36 | 15 | 4 | 17 | 1,821 | 379 | 261 | 1,181 |
| Ex. 3 | S1-3 | 13 | 5 | 2 | 6 | 826 | 69 | 164 | 592 |
| | S2-3 | 16 | 7 | 2 | 7 | 1,099 | 294 | 198 | 607 |
| | Total | 29 | 12 | 4 | 13 | 1,925 | 363 | 362 | 1,199 |
| Ex. 4 | S1-4 | 15 | 6 | 3 | 6 | 768 | 64 | 229 | 475 |
| | S2-4 | 20 | 9 | 2 | 9 | 1,091 | 261 | 149 | 681 |
| | Total | 35 | 15 | 5 | 15 | 1,859 | 325 | 378 | 1,156 |

TABLE 1-continued

| | | | | | | | | | |
|---|---|---|---|---|---|---|---|---|---|
| Ex. 5 | S1-5 | 13 | 5 | 2 | 6 | 455 | 20 | 107 | 328 |
| | S2-5 | 25 | 10 | 2 | 13 | 1,460 | 375 | 149 | 936 |
| | Total | 38 | 15 | 4 | 19 | 1,915 | 395 | 256 | 1,264 |
| Ex. 6 | S1-6 | 20 | 9 | 3 | 8 | 1,097 | 229 | 236 | 632 |
| | S2-6 | 10 | 2 | 3 | 5 | 1,373 | 80 | 453 | 840 |
| | Total | 30 | 11 | 6 | 13 | 2,470 | 309 | 689 | 1,472 |
| Ex. 7 | S1-7 | 17 | 7 | 5 | 5 | 1,495 | 348 | 471 | 676 |
| | S2-7 | 22 | 9 | 3 | 10 | 1,863 | 232 | 404 | 1,228 |
| | Total | 39 | 16 | 8 | 15 | 3,358 | 580 | 874.9 | 1,904 |

| Optical filter | Dielectric multilayer film | Total number of layers | Number of layers | | | Total thickness (nm) | Thickness (nm) | | |
|---|---|---|---|---|---|---|---|---|---|
| | | | Si | $Nb_2O_5$ | Si | | Si | $Nb_2O_5$ | $SiO_2$ |
| Ex. 8 | S1-8 | 13 | 4 | 4 | 5 | 722 | 98 | 246 | 378 |
| | S2-8 | 22 | 8 | 3 | 11 | 1,146 | 227 | 193 | 725 |
| | Total | 35 | 12 | 7 | 16 | 1,868 | 325 | 440 | 1,103 |

TABLE 2

| Optical filter | Partial structure A (nm) | | | | | | | | | Partial structure B (nm) | | | | | |
|---|---|---|---|---|---|---|---|---|---|---|---|---|---|---|---|
| | Si | $Ta_2O_5$ | Si | Si | $Ta_2O_5$ | Si | Si | $Ta_2O_5$ | Si | $SiO_2$ | $Ta_2O_5$ | Si | Si | $Ta_2O_5$ | $SiO_2$ |
| Ex. 1 | | — | | | — | | | — | | | — | | | — | |
| | | — | | | — | | | — | | | — | | | — | |
| | | — | | | — | | | — | | | — | | | — | |
| Ex. 2 | 6 | 69 | 4 | | — | | | — | | 32 | 44 | 4 | | — | |
| | | — | | | — | | | — | | 90 | 39 | 43 | | — | |
| | | — | | | — | | | — | | | — | | | — | |
| Ex. 3 | | — | | | — | | | — | | 124 | 69 | 4 | 4 | 95 | 223 |
| | 104 | 40 | 10 | | — | | | — | | 165 | 158 | 42 | | — | |
| | | — | | | — | | | — | | | — | | | — | |
| Ex. 4 | | — | | | — | | | — | | 121 | 70 | 4 | 4 | 97 | 210 |
| | | — | | | — | | | — | | | — | | 15 | 25 | 176 |
| | | — | | | — | | | — | | | — | | | — | |
| Ex. 5 | 6 | 72 | 4 | | — | | | — | | | — | | | — | |
| | | — | | | — | | | — | | | — | | | — | |
| | | — | | | — | | | — | | | — | | | — | |
| Ex. 6 | 27 | 37 | 26 | 26 | 42 | 11 | | — | | 105 | 157 | 95 | | — | |
| | | — | | | — | | | — | | 423 | 132 | 38 | | — | |
| | | — | | | — | | | — | | | — | | | — | |
| Ex. 7 | 16 | 71 | 159 | 73 | 44 | 13 | 13 | 41 | 10 | 336 | 102 | 159 | 74 | 213 | 336 |
| | | — | | | — | | | — | | 290 | 118 | 8 | 94 | 118 | 408 |
| | | — | | | — | | | — | | | — | | | — | |

| Optical filter | Partial structure B (nm) | | | | | | Partial structure C (nm) | | | | | |
|---|---|---|---|---|---|---|---|---|---|---|---|---|
| | $SiO_2$ | $Ta_2O_5$ | Si | Si | $Ta_2O_5$ | $SiO_2$ | $SiO_2$ | $Ta_2O_5$ | $SiO_2$ | $SiO_2$ | $Ta_2O$ | $SiO_2$ |
| Ex. 1 | | — | | | — | | | — | | | — | |
| | | — | | | — | | | — | | | — | |
| Ex. 2 | | — | | | — | | | — | | | — | |
| | | — | | | — | | 167 | 108 | 171 | | — | |
| | | — | | | — | | | — | | | — | |
| Ex. 3 | | — | | | — | | | — | | | — | |
| | | — | | | — | | | — | | | — | |
| | | — | | | — | | | — | | | — | |
| Ex. 4 | 210 | 62 | 9 | | — | | | — | | | — | |
| | 176 | 124 | 65 | | — | | | — | | | — | |
| | | — | | | — | | | — | | | — | |
| Ex. 5 | | — | | | — | | 4 | 36 | 34 | | — | |
| | | — | | | — | | 137 | 109 | 205 | 57 | 39 | 91 |
| Ex. 6 | | — | | | — | | | — | | | — | |
| | | — | | | — | | 10 | 63 | 101 | 423 | 258 | 235 |
| Ex. 7 | | — | | | — | | | — | | | — | |
| | 408 | 168 | 22 | | — | | | — | | | — | |
| | | — | | | — | | | — | | | — | |

TABLE 2-continued

| Optical filter | Partial structure A (nm) | | | | | | | | | Partial structure B (nm) | | | | | |
|---|---|---|---|---|---|---|---|---|---|---|---|---|---|---|---|
| | Si | $Nb_2O_5$ | Si | Si | $Nb_2O_5$ | Si | Si | $Nb_2O_5$ | Si | $SiO_2$ | $Nb_2O_5$ | Si | Si | $Nb_2O_5$ | $SiO_2$ |
| Ex. 8 | | — | | | — | | | — | | 10 | 82 | 73 | 11 | 46 | 218 |
| | | — | | | — | | | — | | 33 | 58 | 35 | | — | |
| | | — | | | — | | | — | | | — | | | | |

| Optical filter | Partial structure B (nm) | | | | | | Partial structure C (nm) | | | | | |
|---|---|---|---|---|---|---|---|---|---|---|---|---|
| | $SiO_2$ | $Nb_2O_5$ | Si | Si | $Nb_2O_5$ | $SiO_2$ | $SiO_2$ | $Nb_2O_5$ | $SiO_2$ | $SiO_2$ | $Nb_2O_5$ | $SiO_2$ |
| Ex. 8 | 218 | 95 | 10 | 10 | 23 | 35 | | — | | | — | |
| | | — | | | — | | 169 | 63 | 33 | 7 | 72 | 188 |
| | | — | | | — | | | — | | | | |

TABLE 3

| Optical filter | | Ex. 1 | | Ex. 2 | | Ex. 3 | | Ex. 4 | | Ex. 5 | | Ex. 6 | | Ex. 7 | | Ex. 8 | |
|---|---|---|---|---|---|---|---|---|---|---|---|---|---|---|---|---|---|
| Dielectric multilayer films | | S1-1 | S2-1 | S1-2 | S2-2 | S1-3 | S2-3 | S1-4 | S2-4 | S1-5 | S2-5 | S1-6 | S2-6 | S1-7 | S2-7 | S1-8 | S2-8 |
| Near infrared light maximum transmittance | $T_{800\text{-}1600(0)MAX}$ (%) | 98.3 | | 99 | | 98.7 | | 99.3 | | 98.9 | | 99.9 | | 98.2 | | 94.6 | |
| Near infrared light minimum reflectance | $R_{800\text{-}1600(50)MIN}$ (%) | — | 1.6 | — | 0.8 | — | 0.5 | — | 0.3 | — | 1.3 | — | 0.4 | — | 0.2 | — | 0.4 |
| Near infrared light minimum transmittance | $T_{880\text{-}920(0)MIN}$ (%) | 95.5 | | 95.6 | | 96.0 | | 96.2 | | 94.8 | | — | | — | | 92.7 | |
| Near infrared light average reflectance | $R_{880\text{-}920(50)AVE}$ (%) | — | 2.0 | — | 0.9 | — | 0.6 | — | 0.4 | — | 1.5 | — | — | — | — | — | 0.5 |
| Near infrared light minimum transmittance | $T_{1530\text{-}1570(0)MIN}$ (%) | | — | | — | | — | | — | | — | 99.8 | | 97.8 | | | — |
| Near infrared light average reflectance | $R_{1530\text{-}1570(50)AVE}$ (%) | — | — | — | — | — | — | — | — | — | — | — | 0.4 | — | 0.5 | — | — |
| Visible light average transmittance | $T_{400\text{-}680(0)AVE}$ (%) | 0.1 | | 0 | | 0.1 | | 0.1 | | 0 | | 0.1 | | 0.0 | | 0.1 | |
| Visible light average reflectance | $R_{400\text{-}680(5)AVE}$ (%) | 2.1 | — | 5.5 | — | 4.4 | — | 3.3 | — | 6.1 | — | 2.1 | — | 4.8 | — | 4.5 | — |

As seen from the above results, in the optical filters of Examples 2-4, 6 and 7 which included two or more $Ta_2O_5$ films and a partial structure B ($SiO_2/Ta_2O_5/Si$), the maximum transmittance $T_{800\text{-}1600MAX}$ in the wavelength range of 800 nm to 1,600 nm was as high as 90% or higher and the minimum reflectance $R_{800\text{-}1600(50)MIN}$ at the incident angle 50° in the wavelength range of 800 nm to 1,600 nm was as low as 1% or lower. It was therefore found that high transmissivity for near infrared light and low reflectivity for near infrared light at a large incident angle were satisfied at the same time.

In the optical filter of Example 8 which included two or more $Nb_2O_5$ films and a partial structure B ($SiO_2/Nb_2O_5/Si$), also the maximum transmittance $T_{800\text{-}1600MAX}$ in the wavelength range of 800 nm to 1,600 nm was as high as 90% or higher and the minimum reflectance $R_{800\text{-}1600(50)MIN}$ at the incident angle 50° in the wavelength range of 800 nm to 1,600 nm was as low as 1% or lower. It was therefore found that high transmissivity for near infrared light and low reflectivity for near infrared light at a large incident angle were satisfied at the same time.

In the optical filter of Example 1 which does not include a $Ta_2O_5$ film and the optical filter of Example 5 which includes the $Ta_2O_5$ film but does not include a partial structure B ($SiO_2/Ta_2O_5/Si$), the minimum reflectance $R_{800\text{-}1600(50)MIN}$ at the incident angle 50° in the wavelength range of 800 nm to 1,600 nm was higher than 1%, that is, low reflectivity for near infrared light at a large incident angle was not attained.

INDUSTRIAL APPLICABILITY

Being superior in transmissivity and low reflectivity of near infrared light and shieldability of visible light, the optical filter according to the invention is useful when used for, for example, information acquisition devices such as cameras and sensors of transport machines that have been being increased in performance in recent years.

DESCRIPTION OF SYMBOLS

1A . . . Optical filter
10 . . . Substrate
S1 . . . Dielectric multiplayer film
S2 . . . Dielectric multiplayer film

What is claimed is:

1. An optical filter comprising:

a substrate having a first major surface and a second major surface;

a first dielectric multilayer film laid on or above the first major surface; and a second dielectric multilayer film laid on or above the second major surface, wherein:

each of the first dielectric multilayer film and the second dielectric multilayer film is a laminate in which one or more low refractive index films, one or more medium refractive index films, and one or more high refractive index films are laid;

each of the first dielectric multilayer film and the second dielectric multilayer film comprises two or more medium refractive index films;

each of the first dielectric multilayer film and the second dielectric multilayer film comprises a structure that the low refractive index film, the medium refractive index film, and the high refractive index film are laid in order; and the optical filter satisfies both of the following spectral characteristics (i-1) and (i-2):

(i-1) a maximum transmittance $T_{800-1600(0)MAX}$ at an incident angle 0° in a wavelength range of 800 nm to 1,600 nm is 90% or higher; and (i-2) a minimum reflectance $R_{800-1600(50)MIN}$ at an incident angle 50° in the wavelength range of 800 nm to 1,600 nm is 1% or lower.

2. The optical filter according to claim 1, wherein the optical filter further satisfies both of the following spectral characteristics (i-3) and (i-4):

(i-3) an average transmittance $T_{400-680(0)AVE}$ at an incident angle 0° in a wavelength range of 400 nm to 680 nm is 2% or lower; and (i-4) an average reflectance $R_{400-680(5)AVE}$ at an incident angle 5° in the wavelength range of 400 nm to 680 nm is 10% or lower.

3. The optical filter according to claim 1, wherein the first dielectric multilayer film and the second dielectric multilayer film have a total thickness of 1.2 μm to 2.9 μm.

4. The optical filter according to claim 1, wherein the first dielectric multilayer film has a number of lamination layers of 10 to 22.

5. The optical filter according to claim 1, wherein the second dielectric multilayer film has a number of lamination layers of 8 to 26.

6. The optical filter according to claim 1, wherein the first dielectric multilayer film has a thickness of 0.3 μm to 1.3 μm.

7. The optical filter according to claim 1, wherein the second dielectric multilayer film has a thickness of 0.8 μm to 1.6 μm.

8. The optical filter according to claim 1, wherein the high refractive index films have a total thickness of 0.1 μm to 0.6 μm in each of the first dielectric multilayer film and the second dielectric multilayer film.

9. The optical filter according to claim 1, wherein the medium refractive index films have a total thickness of 0.1 μm to 0.9 μm in each of the first dielectric multilayer film and the second dielectric multilayer film.

10. The optical filter according to claim 1, wherein the low refractive index films have a total thickness of 0.8 μm to 1.8 μm in each of the first dielectric multilayer film and the second dielectric multilayer film.

11. A LiDAR sensor comprising the optical filter according to claim 1 as a cover of a sensor module.

* * * * *